Sept. 12, 1961     C. L. COUGHLIN ET AL     2,999,489
SPRING MOTOR ENGINE STARTER
Filed March 30, 1960     4 Sheets-Sheet 1
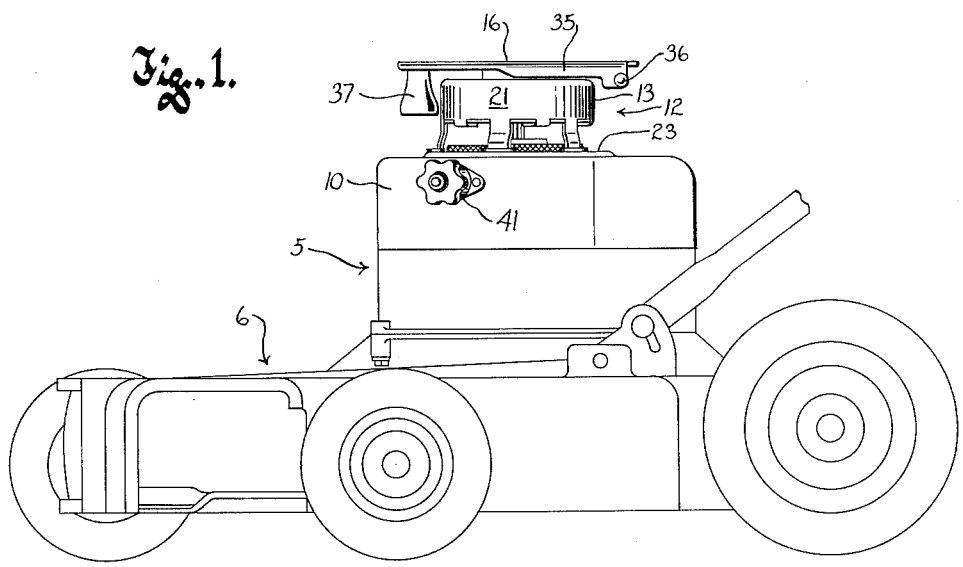
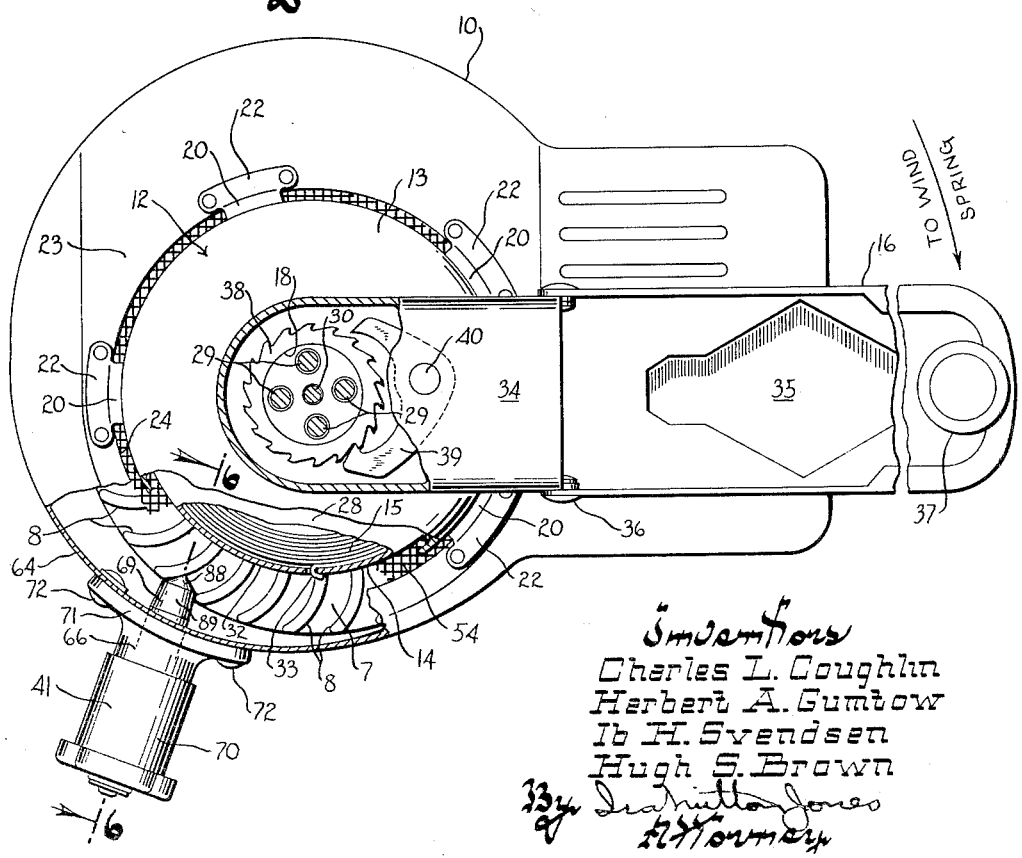
Inventors
Charles L. Coughlin
Herbert A. Gumtow
Ib H. Svendsen
Hugh S. Brown Sept. 12, 1961     C. L. COUGHLIN ET AL     2,999,489
SPRING MOTOR ENGINE STARTER
Filed March 30, 1960     4 Sheets-Sheet 2

Inventors
Charles L. Coughlin
Herbert A. Gumtow
Ib H. Svendsen
Hugh S. Brown

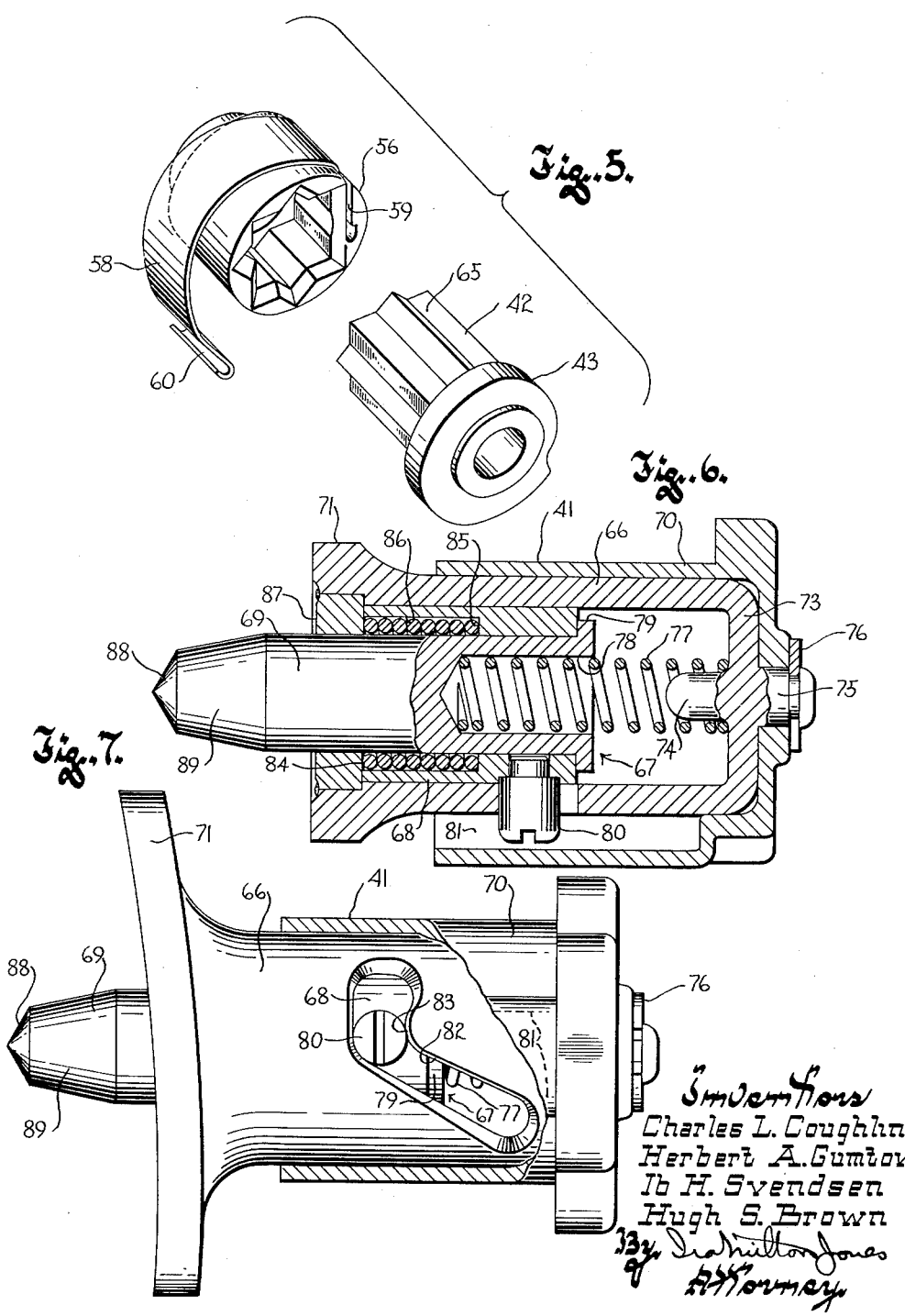

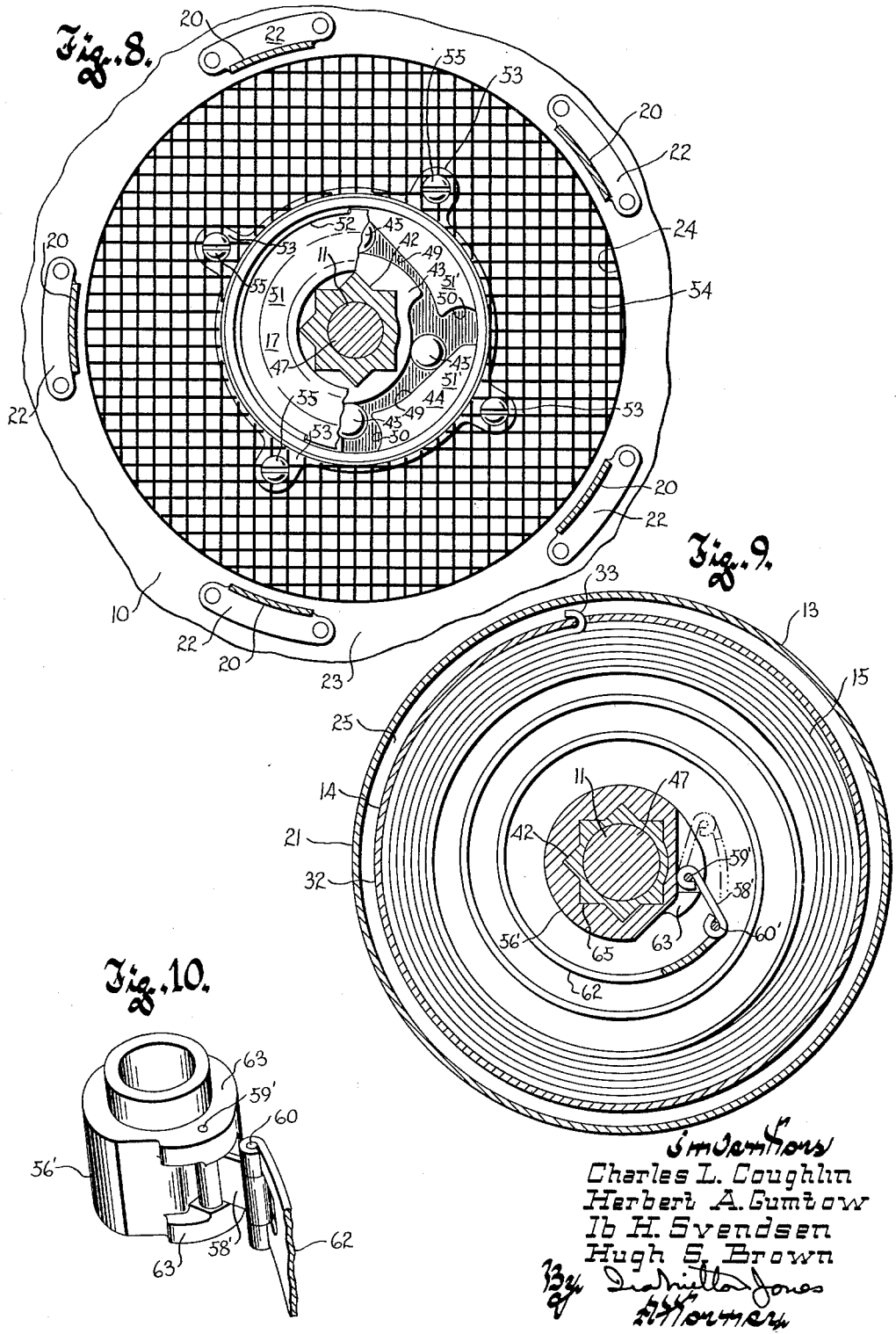

_United States Patent Office_ 2,999,489
Patented Sept. 12, 1961

2,999,489
SPRING MOTOR ENGINE STARTER
Charles L. Coughlin, Herbert A. Gumtow, and Ib H. Svendsen, Milwaukee, and Hugh S. Brown, Wauwatosa, Wis., assignors to Briggs & Stratton Corporation, Milwaukee, Wis., a corporation of Delaware
Filed Mar. 30, 1960, Ser. No. 18,754
10 Claims. (Cl. 123—179)

This invention relates to spring motors, and refers more particularly to a spring motor starter for reciprocating internal combustion engines such as are used on power lawn mowers and the like.

The general object of this invention is to provide a spring motor engine starter of the character described which is inexpensive to manufacture, easy to operate and to service, simple and compact, and unusually rugged and durable.

In furtherance of this general object, it is a more specific object of this invention to provide a spring motor engine starter of the character described wherein a spirally coiled spring is housed in a rotatable spring carrier to which the outer end of the spring is connected, wherein the inner end of the spring has a connection with the driving member of an overrunning clutch, the driven member of which is connected with an engine crankshaft, and wherein very simple means are provided for constraining the spring carrier to rotation in the spring winding direction and for preventing rotation of the clutch members while the spring is being wound.

It is another specific object of this invention to provide locking means for releasably holding the overrunning clutch mechanism driven by the spring of a spring motor engine starter of the character described, which locking means is very accessibly mounted on the engine structure and engages a rotatable part on the crankshaft at a substantial distance from the crankshaft axis so that the locking means can resist high torsional moments with the exertion of only a relatively small force and can therefore be readily moved to its disengaged position for starting of the engine.

In this same connection it is also an object of this invention to provide a spring motor engine starter of the character described which has its parts so arranged that its spring is wound from the outside by rotation of a spring carrier in which the spring is coiled and the stored energy of the spring is imparted to an overrunning clutch mechanism which provides a connection between the innermost convolution of the spring and an engine crankshaft, and wherein the means for holding the overrunning clutch mechanism against rotation is simple and compact and exerts its holding force at a radial moment arm of substantial length, all despite the compactness of the spring motor structure.

It is another object of this invention to provide, in an internal combustion engine of the type having a flywheel provided with fan blades and a blower shroud around the flywheel by which cooling air can be directed across the engine, a spring motor starter mechanism which can be assembled onto the blower shroud as a subassembly, before the blower shroud is assembled onto the engine.

Another object of this invention is related to the fact that a spring motor starter includes a rotatable part which serves as a connection between the spring and the engine crankshaft, and which tends to be accelerated very rapidly if the engine starts while the spring is still partially wound. Such rotational acceleration of the rotating part is due to the fact that all of the then-remaining energy stored in the spring is exerted in rotating said part, and the speed attained by the part is high enough so that its inertia tends to keep it rotating at high speed after the spring is fully unwound, causing it to tend to overrun the end portion of the spring with which it is connected and to exert forces upon the spring that are large enough to damage it. With this in mind, it is an object of this invention to provide a connection between the spirally coiled spring of a spring motor and the rotating part that is directly coupled to the spring, which connection permits the rotational inertia possessed by the rotating part when the spring is unwound to be dissipated without damage to the spring.

More specifically, it is an object of this invention to provide a lost motion connection between one end of a spirally wound spring of a spring motor and a part intended to be rotatably driven by the spring, by which connection the rotational inertia of said part is harmlessly dissipated after the spring is unwound, but which connection does not need to be manually reestablished when the spring is subsequently rewound.

Another specific object of this invention is to provide a spring motor engine starter of the character described which has certain parts, and particularly an overrunning clutch assembly, that are common to a conventional rewind type of rope starter, thereby minimizing manufacturing and inventory costs.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 1 is a side elevational view of a power lawn mower, the engine of which is equipped with a spring motor starter embodying the principles of this invention;

FIGURE 2 is a top view of an engine having the starter of this invention, with portions broken away to show details;

FIGURE 5 is a disassembled perspective view of the driving member of the over-running clutch mechanism and the collar which provides a connection between it and the spring;

FIGURE 6 is a sectional view on an enlarged scale taken on the plane of the line 6—6 in FIGURE 2;

FIGURE 7 is a side elevational view of the lock means for preventing rotation of the engine crankshaft while the spring of the starting motor is being wound, portions being shown broken away;

FIGURE 8 is a sectional view taken on the plane of the line 8—8 in FIGURE 3;

FIGURE 9 is a sectional view corresponding to FIGURE 4, but showing a modified embodiment of the connection between the spring and the rotatable part which it drives; and FIGURE 10 is a perspective view of the spring connector collar shown in FIGURE 9, together with its connection with the inner end portion of the spring.

Figure 3:
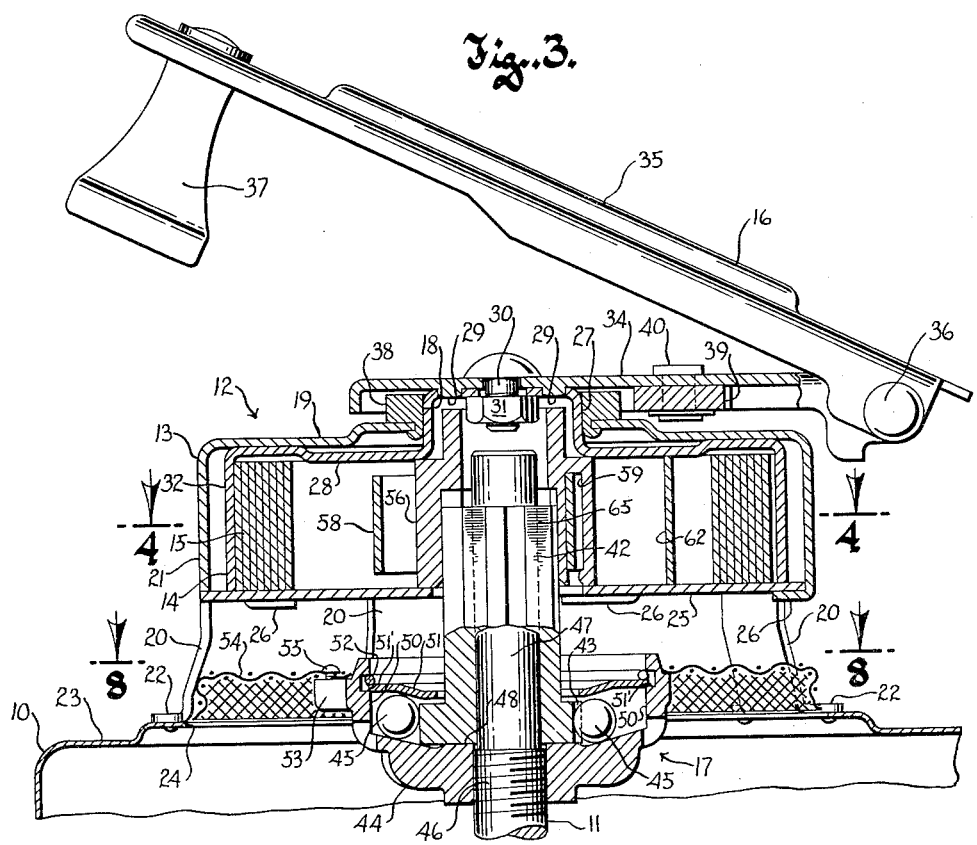
FIGURE 3 is a vertical sectional view of the spring motor starter.

Referring now more particularly to the accompanying drawings, the numeral 5 designates generally an internal combustion engine which is shown mounted on a rotary power lawn mower 6 by way of illustrating a familiar installation of this well known type of engine. As is conventional, the flywheel 7 of the engine is provided with fan blades 8, and a blower shroud 10 partially encloses the flywheel and the engine body to direct cooling air from the blower flywheel across the body of the engine. The engine is mounted on the lawn mower with its crankshaft 11 upright and with the flywheel and blower shroud at the top of the engine. The spring motor starter of this invention, which is designated generally by 12, is mounted on top of the blower shroud so as to be at the most accessible location on the engine.

The starting motor comprises, in general, a starting motor housing 13, which is fixed on the blower shroud substantially concentrically with the flywheel, a spring casing or carrier 14 which is rotatably mounted in the starter motor housing 13 and which carries a spirally coiled spring 15, a crank arm 16 accessibly mounted above the starting motor housing and connected with the spring carrier for rotating the same, and an overrunning clutch mechanism 17 which provides a driving connection between the spring and the engine crankshaft.

More specifically, as best seen in FIGURE 3, the starter motor housing 13 is substantially inverted cup-shaped, with mounting legs 20 extending downwardly from its cylindrical side wall 21 and terminating in outturned feet 22 which are secured, as by spot welding, to the upper wall 23 of the blower shroud, around the air inlet opening 24 therein. It will be seen that cooling air for the engine can readily flow between the legs 20 and through the air inlet opening 24 to the flywheel blower. At its bottom the starter housing is closed by an annular plate 25, supported on lugs 26 turned inwardly from the bottom of the cylindrical side wall 21 of the starter motor housing. Coaxially fixed on the top wall 19 of the starter motor housing is an annular ratchet 38, the bore 18 of which provides a bearing to rotatably mount the spring casing or carrier 14.

The spring casing or carrier 14 is generally inverted cup-shaped, and has a coaxial pilot portion 27 projecting upwardly from its top wall which is rotatably journaled in the bearing 18. The crank arm 16 is secured to the pilot portion 27 of the spring carrier by means of a screw 30 extending through the crank arm and a concentric hole in the top of the pilot portion and secured by a nut 31, and the crank arm has tit-like downward projections 29 which are engaged in closely fitting angularly spaced holes in the top of the pilot portion 27 to constrain the spring carrier to turn with the crank arm. It will be observed that the spring carrier rotates on the engine crankshaft axis.

The spring 15 is spirally coiled within the cylindrical side wall 32 of the spring carrier, and is connected thereto to be wound by rotation of the carrier, by having its outer end portion bent into a hook, as at 33, and engaged in an upright slot in said side wall. (See FIGURES 4 and 9.) The spring is edgewise confined (as best seen in FIGURE 3) between the bottom plate 25 of the starter housing and the top wall 28 of the spring carrier.

The crank arm 16 comprises substantially straight inner and outer portions 34 and 35, hingedly connected as at 36 to enable the outer portion 35 to be swung out of the way, over the inner portion 34 and across the top of the starter housing, as shown in FIGURE 1, or to be swung outwardly to an operative position in which the inner and outer portions are lengthwise aligned. A knob 37 on the outer end of the crank arm facilitates its use in winding up the spring.

The crank arm and spring carrier are confined to rotation in the direction in which the spring is wound by means of a double arm pawl 39 carried at the underside of the inner portion 34 of the crank arm, and which cooperates with the stationary ratchet 38 on the top of the starting motor housing. The pawl is rockably mounted on a stud 40 fixed to the inner portion 34 of the crank arm with its axis parallel to that of the spring carrier.

As the spring unwinds, it imparts the energy stored in it to the overrunning clutch mechanism 17, which provides a connection between the spring and the engine crankshaft. To prevent rotation of the clutch mechanism and crankshaft while the spring is being wound, the starting motor of this invention includes a readily releasable lock 41 described in detail hereinafter, which is mounted on the blower shroud and is adapted to engage one of the fan blades 8 on the engine flywheel 7.

The overrunning clutch mechanism 17 comprises a driving member 42 having a spiral shaped cam member 43 at its bottom, a driven member 44 coaxially secured to the engine crankshaft 11, and a number of balls 45 which are adapted to be wedgingly engaged between the driving and driven members when the driving member tends to rotate faster than the driven member, but which disengage themselves when the driven member tends to rotate faster. Attention is directed to the fact that the overrunning clutch mechanism employed in the spring motor starter of this invention may be identical with that used in a common type of rewinding rope starter, so that production and inventory costs are thereby substantially minimized.

As best seen in FIGURES 3 and 8, the driven member 44 of the overrunning clutch mechanism is hub-like and is secured to the engine crankshaft by being threaded onto a portion 46 thereof which is just below its upper end. The driving member 42 is freely rotatable on the plain upper end portion 47 of the crankshaft.

The driven member 44 is substantially cup-shaped and is provided at its interior with tangential side wall surfaces 49 (see FIGURE 8) against which the balls 45 can be wedgingly engaged by the spiral cam 43 on the driving member, and which communicate with substantially radial slots 50 into which the balls roll when the clutch mechanism is disengaged. To confine the balls against upward displacement, the top of the cup-shaped driven member is closed by an annular retainer 51, the outer edge of which rests on a circumferential ledge 51' on the driven member 44, and which is held in place by an expansion-type spring ring 52 overlying its outer marginal edge portion and engaged in a circumferential inwardly opening groove in the rim portion of the driven member.

The inner edge portion of the annular retainer 51 overlies the upper surface 48 of the cam 43 on the driving member, and the driving member is free for limited axial motion between the bottom 48 of the cup-shaped driven member and retainer 51.

The driven member has a plurality of radially projecting lug-like bosses 53 which support the conventional rotating screen 54 that extends across the air inlet opening 24 of the blower shroud, and which bosses receive screws 55 by which the screen is secured to the driven member for rotation therewith.

The actual connection between the inner end of the spring and the driving member 42 of the overrunning clutch mechanism is provided by a collar 56 splined on the upper portion 65 of the drive member. The splined connection between the driving member 42 and the collar 56 may have any suitable form, and in the present instance it consists of a more or less star shaped cross section of the driving member and a correspondingly shaped bore in the collar. It is important however, that this splined connection be fairly loose to assure that the collar is free for axial motion relative to the driving member, thereby accommodating variations in the axial location of the spring casing 14 relative to the driving member, such as are inevitably encountered in manufacturing. The loose fit of the collar on the driving member 42 also prevents the collar from applying twisting or cocking forces to the driving member, which would cause the driving member to bind onto the crankshaft and tend to rotate therewith.

If the engine starts when the spring is only partially unwound, the action of the overrunning clutch is such as to relieve the driving member 42 and the collar 56 carried thereby of substantially all torque load, permitting all of the remaining energy stored in the spring to be expended in rotational acceleration of these members. Naturally they reach a very high rate of rotation under these conditions, and if they were directly connected with the inner end of the spring their continued rotation after the spring had become fully unwound, due to their inertia, would tend to bend or break the inner end portion of the spring. This objectionable possibility is prevented in the starting motor of this invention by a link 58 which connects the collar and the inner end of the spring in such a manner as to allow the collar to override the spring and, while so doing, cooperates with the spring to cause the same to effect harmless absorption of the kinetic energy of the rotating members.

Figure 4:
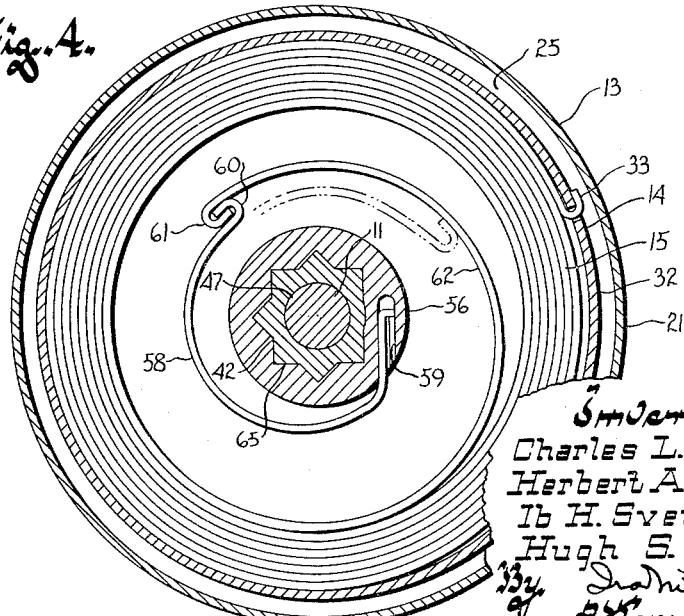
FIGURE 4 is a sectional view taken on the plane of the line 4—4 in FIGURE 3.

In the embodiment of the invention illustrated in FIGURES 4 and 5, the link 58 comprises a length of spring material having its inner end portion anchored in a slot 59 in the collar, while its outer end portion is bent outwardly to provide a hook 60 which is engageable in a similar but oppositely facing hook 61 formed on the inner end portion of the spring.

When rotational inertia causes the collar 56 to tend to overrun the spring, the hooks 60 and 61 disengage, and because the link 58 is biased radially outwardly the hook 60 on its outer end slides along the innermost convolution 62 of the spring, cooperating with the spring to provide frictional braking of the rotating parts 42 and 56. By virtue of the fact that the link 58 is biased radially outwardly by its own resilience, and the inner convolution of the spring has an inwardly directed set, the kinetic energy of the rotating parts will usually be absorbed in friction between the link and the spring by the time the link reaches the relative position of rotation shown in broken lines in FIGURE 4. Obviously when the spring is next wound again the spring rotates relative to the link until the hooks 60 and 61 automatically reengage themselves.

Since the successful operation of the lost motion connection just described depends upon the rather accurate adjustment of the relaxed positions of the link 58 and the inner spring convolution 62, the preferred connection between the inner end of the spring and the collar on the driving member of the overrunning clutch mechanism is that illustrated in FIGURES 9 and 10. The collar 56' in this version is generally similar to that described above, but the link 58' must have substantial rigidity so as to be capable of withstanding endwise compression, and it has hinge connections with the collar and the spring which provide for its relative swinging motion about axes parallel to the axis of the engine crankshaft. The collar has a pair of axially spaced apart radially projecting flanges 63, in which the opposite ends of a pin 59' are anchored to pivotally secure the inner end of the link to the collar, while a pin 60' provides a permanent hinge connection between the outer end of the link and the inner end of the spring. Preferably the inner spring convolution 62 has a permanent inwardly directed set such that the link 58' normally extends circumferentially from the collar in the direction opposite to that of crankshaft rotation, in the position shown in full lines in FIGURE 9, and when the driving member 42 tends to override the spring the link is caused to swing outwardly, against the inward bias of the spring, to the position shown in dotted lines in FIGURE 9. In thus crossing a "dead center" position, the link 58' flexes the spring, causing it to reabsorb and harmlessly dissipate the rotational inertia of the clutch driving member 42.

As best seen in FIGURE 2, the releasable stop mechanism 41, by which the engine is held against rotation while the spring is being wound, is mounted on the side wall 64 of the blower shroud 10, onto which it can be conveniently installed before the blower shroud is assembled onto the engine and where it is readily accessible in use. The stop mechanism is located in this position to enable it to cooperate with the periphery of the engine flywheel, and consequently the moment arm through which it acts is a substantially long one so that the stop member is not subjected to large stresses and is therefore readily releasable as well as highly dependable and durable. Because of this location of the stop mechanism, moreover, the spring motor itself may have the relatively simple construction described above, permitting the use of a standard overrunning clutch mechanism 17 which is common to a rewinding rope type of starter.

The stop mechanism 41 comprises, in general, a substantially tubular housing 66 fixed to the blower shroud 10, with its axis substantially radial to the crankshaft axis, a plunger mechanism 67 endwise slidably carried in the housing and comprising a sleeve 68 and an elongated stop member 69 slidably carried in the sleeve for axial motion relative thereto, and a cap-like actuator 70 rotatably mounted on the housing and accessible at the exterior thereof.

The stop mechanism housing 66, which may be formed as a unitary die casing, has a flange 71 on its inner end by which it is secured, as by rivets 72, to the blower shroud side wall. The outer end of the housing 66 is closed by a wall portion 73 that has integral inwardly and outwardly projecting coaxial pilots 74 and 75. The outwardly projecting pilot rotatably mounts the cap-like actuator 70 on the housing, extending through a closely fitting coaxial hole in the actuator, and a spring clip 76 engaged in a groove in said pilot, near its outer end, holds the actuator against axial displacement off of the housing.

The elongated stop member 69 is biased lengthwise toward the flywheel by means of a coiled compression spring 77 reacting between the outer end wall 73 of the housing and the plunger. The spring 77 is steadied by having its outer end embracing the inwardly projecting pilot 74 on the housing end wall and its inner end portion received in an outwardly opening coaxial well 78 in the stop member. The inward limit of stop member motion in response to the bias of the spring 77 is defined by the engagement of a radially outwardly projecting circumferential flange 79 on the stop member with the outer end of the sleeve 68 in which the stop member is slidably carried. The axial position of the sleeve in the housing is determined by rotation translating means comprising cooperating abutments 80 and 81 on the sleeve and on the actuator 70, engageable through a slot 82 in the cylindrical side wall of the housing.

More specifically, the abutment 80 on the sleeve comprises a laterally projecting stud or screw, and the abutment 81 on the actuator may be provided by lengthwise extending wall portions defining a groove in which the outer end portion of the screw has a loose fit. The sleeve is thus constrained to rotate with the actuator, but is lengthwise slidable relative to the actuator and the housing, and rotation of the sleeve is translated into axial motion thereof toward and from the flywheel by reason of the fact that the slot 82 in the housing wall provides an inclined cam track. At its axially inner end portion the cam slot 82 has a hump 83 which provides for slight regressive motion of the sleeve as it reaches its most inward position, thus providing a detent which is rendered effective by a detent spring 84 that biases the sleeve axially outwardly.

The detent spring 84, which is substantially stiffer than the stop member spring 77, is confined in a counterbore 86 in the sleeve, opening to its inner end, and it closely embraces the medial portion of the stop member 69. The detent spring reacts axially between an inwardly facing shoulder 85 on the sleeve, defined by the bottom of the counterbore 86, and an annular plug 87 fixed in the inner end of the housing 66 and through which the stop member 69 projects.

It will be seen that the springs 77 and 84 tend to oppose one another, but because the detent spring 84 is stiffer, it can urge the sleeve and the stop member rearwardly, against the bias of the spring 77, when the abutment screw 80 rides over the hump 83 in the cam track 82, thus providing a marked detent action which defines the extended position of the plunger mechanism 67, at which the stop member 69 is engaged with one of the fan blades 8 on the blower flywheel. Nevertheless, when the stop member is thus fully extended it can be forced back toward its retracted position, against the bias of spring 77, because of the unidirectional driving connection between it and the sleeve, provided by the flange 79 and the opposing outer end of the sleeve. It will also be apparent that the detent spring 84 tends to move the plunger mechanism toward its retracted position as soon as the actuator is rotated in the releasing direction a sufficient distance to carry the abutment 80 past the hump 83 on the cam track, thus assuring that release of the locking mechanism from the flywheel will be accomplished with a snappy, positive action when the engine is to be started.

The impositive connection between the stop member 69 and the actuator 70, provided by the sleeve 68 and the spring 77, cooperates with the specific shape of the inner end portion of the stop member to prevent damage in the event the stop mechanism is inadvertently moved to its extended position while the flywheel is rotating. The inner end portion 88 of the stop member has an abrupt conical taper so that its surface is disposed at an oblique angle to both the orbit of the fan blades and its own axis. Hence, if the stop member is inadvertently moved toward its extended position while the flywheel is rotating, the tips of the fan blades, by their glancing engagements with the conical surface at the inner end of the stop member, will readily cam the stop member outwardly out of their way, against the bias of spring 77, without damage to either the blades or the stop member. However, when the flywheel is stationary the stop member will effectively hold it against rotation because a portion 89 of the stop member which is outwardly adjacent to its conical tip portion 86 is adapted to be interposed between a pair of adjacent blades and to present a surface which is disposed substantially normal to one of them, by which its orbital motion is blocked. The portion 89 of the stop member has a slight conical taper to insure that it will extend a substantial distance into the space between its adjacent blades and securely resist flywheel rotation, but because of its round cross section it makes only line contact with the blade it engages and it is therefore easily withdrawn to its retracted position.

It will be observed that the starting motor of this invention is very easy to assemble. The spring, with the collar 56 connected to its inner end, is coiled inside the spring carrier 14, and the crank arm 16 (with pawl 39 attached thereto) is assembled to the spring carrier and the starting motor housing 13 by means of the screw 30. To facilitate such assembly the nut 31 may be welded or otherwise secured to the underside of the pilot portion 27 of the spring carrier. The ratchet-bearing 18 is of course secured in the top wall of the starting motor housing before the crank arm and spring carrier are assembled thereto.

The overrunning clutch mechanism 17 is screwed onto the engine crankshaft, and the rotating screen 54 is then secured to the driven member 44 of the overrunning clutch mechanism. Thereafter the blower shroud 10, with the stop mechanism 41 and the starter motor housing assembly in place thereon, is assembled onto the engine, taking care that the driving member 42 of the overrunning clutch mechanism is properly received in the collar 56. It will be observed that the starting motor housing need not be exactly coaxial on the blower shroud because the pilot portion 27 of the spring carrier has a substantially larger inside diameter than the upper portion of the collar 56 which is received therein, and the spring, by reason of its flexibility, can accommodate substantial misalignment between the axes of the spring carrier and the collar.

Assembly of the stop mechanism is likewise simple. The spring 77 is first placed in the housing 66, and then the sleeve 68, with the stop member 69 in place therein, is inserted into the housing. The detent spring 84 is placed around the stop member and the plug 87 is staked in place to hold the inside parts assembled. The abutment screw 80 is secured in the sleeve, through the cam slot 82, and the cap-like actuator 70 can then be slipped over the outer pilot 75 and secured with the spring clip 76. The assembled stop mechanism can then be riveted onto the blower shroud.

From the foregoing description, taken together with the accompanying drawings, it will be apparent that this invention provides an inexpensive, compact, readily assembled and very dependable spring motor starter for an internal combustion engine.

What is claimed as our invention is:

1. In a spring motor starter for rotating the crankshaft of an internal combustion engine of the type having a flywheel on its crankshaft which is provided with fan blades for forcing cooling air across the engine, means for preventing rotation of the crankshaft while the spring of the spring motor is being wound, said means comprising: a stop member; means slidably mounting the stop member on a fixed part of the engine adjacent to the flywheel, and guiding the stop member for linear motion substantially radially with respect to the flywheel between an extended position engaged between two adjacent fan blades on the flywheel to prevent rotation of the flywheel, and a retracted position in which the stop member is clear of the flywheel; means to releasably and impositively hold the stop member in said extended position, said means including a spring biasing the stop member to its extended position; and manually controllable means for retracting the stop member and holding it in its retracted position.

2. In a spring energized starting motor for an internal combustion engine of the type having a flywheel on its crankshaft which is provided with fan blades by which cooling air is forced across the engine when the crankshaft is rotating, means for readily releasably holding the crankshaft against rotation to permit the spring of the starting motor to be wound up, said means comprising: a substantially tubular housing secured on a fixed part of the engine adjacent to the flywheel, with the axis of the housing substantially radial to the flywheel axis; a plunger-like element mounted in said housing for sliding motion lengthwise of the housing between defined retracted and extended positions, said plunger-like element including a stop member which engages a fan blade on the flywheel when the plunger-like element is in its extended position; spring means reacting between said plunger-like element and a part fixed with respect to the housing to bias the plunger-like element toward its retracted position; a cap rotatably mounted on the housing and providing a manual actuator; and cooperating motion translating means on the cap, the plunger-like element and the housing, for translating rotation of the cap in one direction into endwise movement of the plunger-like element to its extended position, and cooperating with said spring means to provide a detent which defines the extended position of the plunger-like element, and by which rotation translating means the plunger-like element is permitted to return to its retracted position in response to bias of said spring when the cap is rotated in the opposite direction.

3. In a spring motor starter for rotating the crankshaft of an internal combustion engine of the type having a flywheel on its crankshaft, means for readily releasably holding the crankshaft against rotation to permit the spring of the starting motor to be wound up, said means comprising: a substantially tubular housing secured on a fixed part of the engine adjacent to the flywheel, with its axis substantially radial to the crankshaft axis; a sleeve mounted in said housing for endwise sliding motion toward and from the flywheel; a first spring in the housing reacting between the housing and said sleeve to bias the sleeve away from the flywheel; an elongated stop member slidably carried in said sleeve and having an inner end portion adapted to project from the sleeve and engage the flywheel to prevent rotation of the flywheel; a second spring reacting between the housing and the stop member to urge the latter toward the flywheel; cooperating abutments on the sleeve and the stop member normally maintained in engagement by the biasing force of the first and second springs upon the sleeve and the stop member; a cap rotatable on the housing to provide a manual actuator; and cooperating motion transmitting abutments on said cap and on the sleeve, engageable through and cooperating with a cam slot in the housing by which rotation of the cap in one direction is translated into endwise movement of the sleeve toward the flywheel, from a retracted position in which the sleeve holds the stop member clear of the flywheel, against the bias of said second spring, to an extended position of the sleeve, nearer the flywheel at which said first spring cooperates with the rotation transmitting abutments and said cam slot to define a detent, and at which said second spring maintains the stop member in engagement with the flywheel.

4. In a spring motor starter for rotating the crankshaft of an internal combustion engine of the type having a flywheel on its crankshaft, means for readily releasably holding the crankshaft against rotation to permit the spring of the starting motor to be wound, said means comprising: an abutment on the peripheral portion of the flywheel; a housing mounted on a fixed part of the engine adjacent to the peripheral portion of the flywheel; a stop member movably mounted in the housing for motion to and from an extended crankshaft locking position engaging said abutment on the flywheel; a spring in the housing reacting between the housing and the stop member to bias the latter to its extended crankshaft locking position; an actuator accessibly mounted on the housing for manual movement in opposite directions between defined positions; and means providing a unidirectional motion transmitting connection between the actuator and the stop member whereby motion of the actuator to one of its defined positions carries the stop member out of its extended crankshaft locking position, clear of the abutment on the flywheel, against the bias of said spring, and motion of the actuator to its other defined position permits the stop member to move to its extended crankshaft locking position in response to said bias.

5. A spring starter for an internal combustion engine of the type having a flywheel on its crankshaft which is provided with fan blades and a blower shroud around the flywheel for directing cooling air from the flywheel across the engine, said starter comprising: a starter housing fixed on the blower shroud substantially concentrically with the flywheel; a spring carrier rotatably mounted inside the starter housing; an overrunning clutch comprising a driving member concentrically rotatable in the spring carrier and a driven member drivingly connected with the crankshaft; a spring spirally coiled in the spring carrier, said spring having its outer end connected to the spring carrier and having a connection between its inner end and the driving member of the overruning clutch whereby said driving member is rotatably driven by the spring as the spring unwinds; manual actuator means accessible at the exterior of the starter housing and drivingly connected with the spring carrier for imparting spring winding rotation to the latter; cooperating means fixed on the starter housing and rotatable with the spring carrier for constraining the spring carrier to rotation in the direction to wind the spring; and a stop member mounted on the blower shroud adjacent to the flywheel and readily releasably engageable with one of the fan blades on the flywheel to prevent rotation of the engine crankshaft when the spring is being wound.

6. In a spring motor having a spirally coiled spring disposed in a rotatable spring carrier to which the outer end of the spring is connected so that the spring is adapted to be wound up in consequence of rotation of the spring carrier in one direction, and having a rotation transmitting member concentric with the spring carrier and rotatable independently thereof, which rotation transmitting member is adapted to be rotated by the spring as the latter unwinds: means, including a connecting link having one end permanently eccentrically connected to the rotation transmitting member, providing a lost motion connection between the inner end of the spring and the rotation transmitting member, by which connection the rotation transmitting member is enabled to rotate through at least a portion of a turn after the spring is unwound without carrying the inner end portion of the spring around with it, said link being cooperable with the innermost convolution of the spring during such relative rotation of the rotation transmitting member to utilize inward biasing force of said convolution in harmlessly absorbing kinetic energy possessed by the rotation transmitting member.

7. The spring motor of claim 6, further characterized by the fact that said lost motion connection means includes cooperating abutments on the other end of the link and the inner end portion of the spring, providing a unidirectional driving connection between the link and the spring which disengages itself when the rotation transmitting member overruns the spring; and further characterized by the fact that the link is biased radially outwardly from the rotation transmitting member so that its said other end tends to remain in frictional contact with the inwardly biased convolution of the spring as the rotation transmitting member rotates relative to the spring.

8. The spring motor of claim 6, further characterized by the fact that said link is substantially rigid and has hinge connections with the rotation transmitting member and with the inner end of the spring, both of which hinge connections provide for swinging motion about axes parallel to that of the rotation transmitting member, so that as the rotation transmitting member overruns the spring the outer end of the link swings in an arc eccentric to the axis of the rotation transmitting member, flexing the inwardly biased inner convolution of the spring to cause the spring to absorb the inertia energy of the rotation transmitting member.

9. In a spring motor of the type wherein a spirally coiled spring, confined in a rotatable spring carrier to which its outer end is secured, is connected at its inner end with a rotation transmitting member to which the spring is adapted to impart rotation as it unwinds, means for preventing damage to the inner end portion of the spring by the rotation transmitting member overrunning the spring after the spring is fully unwound, due to rotational inertia of the rotation transmitting member, said means comprising: a substantially rigid link having an eccentric hinged connection with the rotation transmitting member at one of its ends and a hinged connection with the inner end of the spring at its other end, the axes of said hinge connections being parallel to the axis of the rotation transmitting member; and a normally radially inwardly disposed inner end portion on the spring imposing a radially inward bias upon said link so that as the rotation transmitting member rotates relative to the spring after the spring is unwound, the swinging of the link in an arc which carries its outer end away from the axis of the rotation transmitting member flexes the inner end portion of the spring and thus causes the spring to absorb the inertia energy of the rotation transmitting member.

10. The structure of claim 1, wherein the manually controllable means for retracting the stop member and holding it in its retracted position, comprises: a spring yieldingly urging the stop member toward its retracted position, said spring being considerably stronger than the spring biasing the stop member toward its extended position so that when released said stronger spring acts to retract the stop member; and manually engageable and disengageable detent means to restrain said stronger spring so that when said detent means is engaged the stop member is impositively projected to its extended position.

References Cited in the file of this patent

UNITED STATES PATENTS

| | | |
|---|---|---|
| 1,252,579 | Johnson | Jan. 8, 1918 |
| 2,804,173 | De Millar | Aug. 27, 1957 |
| 2,869,682 | De Millar | Jan. 20, 1959 |